United States Patent
Grzonkowski et al.

(10) Patent No.: US 8,411,854 B2
(45) Date of Patent: Apr. 2, 2013

(54) METHOD AND APPARATUS FOR AUTHENTICATING A USER

(75) Inventors: Slawomir Grzonkowski, Grudziadz (PL); Wojciech Zaremba, Galway (IE)

(73) Assignee: National University of Ireland, Galway, Galway (IE)

( * ) Notice: Subject to any disclaimer, the term of this patent is extended or adjusted under 35 U.S.C. 154(b) by 271 days.

(21) Appl. No.: 12/811,317

(22) PCT Filed: Dec. 10, 2008

(86) PCT No.: PCT/EP2008/010465
§ 371 (c)(1),
(2), (4) Date: Jun. 30, 2010

(87) PCT Pub. No.: WO2009/083109
PCT Pub. Date: Jul. 9, 2009

(65) Prior Publication Data
US 2010/0290618 A1    Nov. 18, 2010

(30) Foreign Application Priority Data

Jan. 2, 2008 (IE) .................................. S2008/0001
Feb. 25, 2008 (IE) .................................. S2008/0146

(51) Int. Cl.
*H04L 9/00* (2006.01)

(52) U.S. Cl. .............................. 380/29; 380/44; 708/513

(58) Field of Classification Search .................. 380/29; 708/513
See application file for complete search history.

(56) References Cited

U.S. PATENT DOCUMENTS

| | | | | |
|---|---|---|---|---|
| 4,926,479 A | * | 5/1990 | Goldwasser et al. | 713/180 |
| 2002/0014527 A1 | * | 2/2002 | Sawada | 235/380 |
| 2003/0097571 A1 | * | 5/2003 | Hamilton et al. | 713/182 |

OTHER PUBLICATIONS

Grzonkowski et al., "Extending Web Applications with a Lightweight Zero Knowledge Proof Authentication", Oct. 27-31, 2008, CSTST, pp. 65-70.*
Gerardo I. Simari, "A Primer on Zero Knowledge Protocols"[Online], Jun. 27, 2002, pp. 1-12 XP002528531 Argentina.
Dieter Van Melkebeek, Matthew Anderson: "Zero-Knowledge" [Online] Apr. 13, 2007, pp. 1-7 XP002528532.

* cited by examiner

*Primary Examiner* — Matthew Smithers
(74) *Attorney, Agent, or Firm* — Sullivan & Worcester LLP; Christopher T. McWhinney

(57) ABSTRACT

A method of generating a private key for use in an authentication protocol comprises, at a client: receiving a user specific identifier; converting the identifier through a one-way function to a string of a pre-determined length; and mapping said string to a permutation $\pi_{priv}$ of a pre-determined order, said permutation being operable with a first graph $G_1$ to generate a second graph $G_2 = \pi_{priv}(G_1)$.

20 Claims, 5 Drawing Sheets

π f(1) = c
f(2) = a
f(3) = b
f(4) = e
f(5) = d $G_2$ $G_1$

METHOD AND APPARATUS FOR AUTHENTICATING A USER

FIELD OF THE INVENTION

The present invention provides a method and apparatus for authenticating a user, in particular authenticating a user to a server across a network.

BACKGROUND

Referring to FIG. 1, typically, when a user (Alice) authenticates through a web-application to a server, they are presented with a dialog box within their browser window into which they enter a username and password. The username and password are sent from the web client to the server where they are authenticated. In most cases the credentials are transferred from the client to the server using http. As such, they are prone to being intercepted an attacker. If security is needed, an https protocol can be used. However, the credentials are still sent through the Internet and servers are able to read them.

Asymmetric cryptography offers secure distributed authentication schemes over insecure communication channels. However, users are required to provide public and private key-pairs or digital certificates; and the certificate must be installed for a web browser. This is not an easy task for beginners nor might it be possible if the user is operating a browser from a restricted client such as an Internet café.

Goldwasser, Micali, and Rackoff, "The knowledge complexity of interactive proof-systems", STOC '85: Proceedings of the seventeenth annual ACM symposium on Theory of computing, pages 291-304, New York, N.Y., USA, 1985, ACM Press, discloses ZKP challenge-response authentication protocols, in which a prover proves his identity to a verifier, but the verifier is unable to compute the prover's secret using any received data.

The prerequisite for the protocol is that a user, for instance Alice, has to register her name and a public key and only those credentials are accessible to the verifier. Alice somehow maintains a private key, and the public-private key-pair depends on an NP problem on which the protocol is based. Referring now to FIG. 2, a typical ZKP authentication protocol operates as follows:

Step 1—Alice generates a random problem R and she computes f(R) using a one way hash function. The problem and the function are specific for the NP problem the protocol uses.

Step 2—She sends f(R) to the server where she wants to be authenticated. She keeps R secret.

Step 3—The server stores the received f(R) function and sends a request to Alice. The request contains a challenge. The, challenge is a random decision that requires Alice to be capable of answering one of two questions: one of which demonstrates her knowledge of the private key (f(R, private key)); and the other, an easy question, to prevent her from cheating (R).

Step 4—Alice sends back the answer that depends on the challenge: f(R, private key) or R. She always reveals only one parameter.

Step 5—The server verifies her answer. If the answer is correct, the server can authenticate her or she can be queried for another challenge to decrease the probability of cheating; and thus, loop back to Step 1.

In the above protocol, Step 1 is also called witness, Steps 2 and 3 are challenge, whereas step 4 is response. If the protocol is repeated t times, all t rounds must be answered successfully to prove Alice's identity. The server is always convinced with probability $1-2^{-t}$. In zero-knowledge proof protocols, the verifier cannot learn anything from the authentication procedure. Moreover, the verifier is unable to cheat the prover because of having always only one value R or f(R, private key); this is not sufficient to calculate the prover's secret. Furthermore, the verifier cannot cheat the prover because the protocol is repeated as long as the verifier is not convinced; due to random challenge selection, the verifier cannot pretend to be the prover to a third party.

Typically, ZKP challenge-response protocols are based on: the discrete logarithm problem, the square-root problem, or elliptical curve cryptography.

The discrete logarithm problem is defined as finding x such that $$g^x = b \bmod n$$

where g, b, and n are known for both the prover and verifier and x must be coprime to n.

In the square-root problem, Alice wants to prove that she knows such an x that $$x^2 = b \bmod n$$

for known b, and n and where x must be co-prime to n.

In Elliptic curve cryptography (ECC) a public-private key-par on an elliptic curve is defined as:

$$y^2 = x^3 + ax + b$$

where $4a^3 + 27b^2 \neq 0$, and relies on a complexity of point multiplication over such a curve.

Nonetheless, in each of the above cases, the user's private key must either be available on a local machine from which they are trying to authenticate themselves, or the user must allow their password to be transmitted across a network. The former makes a ZKP implementation based on the above problems infeasible within a browser, while the latter is undesirable.

It is an object of the present invention to provide a more secure form of authentication while preserving the ease of use of simplistic username/password systemS within a web-browser application.

DISCLOSURE OF THE INVENTION

The present invention provides a method according to claim 1.

The invention enables a zero-knowledge proof(ZKP) authentication protocol within a web-browser application.

In the preferred embodiment, the ZKP protocol is based on graph isomorphism which is simple to implement, fast, and provides significant benefits to developers who need to implement user authentication.

Graph isomorphism provides an NP (Non-deterministic Polynomial time) space wherein ZKP implementations can be produced without the computational overhead that has, until now, made ZKP inappropriate for casual user authentication.

The graph isomorphism does not require users' browsers to find co-prime numbers nor multiplicative inverses. It is performed using natural numbers and therefore, its arithmetic is easier to implement than, for example elliptic curves.

Preferred embodiments of the invention are implemented with Ajax. JavaScript and Ajax are suitable for operations on natural numbers and matrixes. They do not require plug-ins and they are supported by default by most web browsers. Hence, integration with existing applications is straightforward. Furthermore, their start-up time is negligible. Such embodiments may therefore be fully distributed, easy to install, and do not need to have any browser dependencies.

BRIEF DESCRIPTION OF THE DRAWINGS

Embodiments of the invention will now be described by way of example, with reference to the accompanying drawings, in which.

DESCRIPTION OF THE PREFERRED EMBODIMENTS

Figure 3:
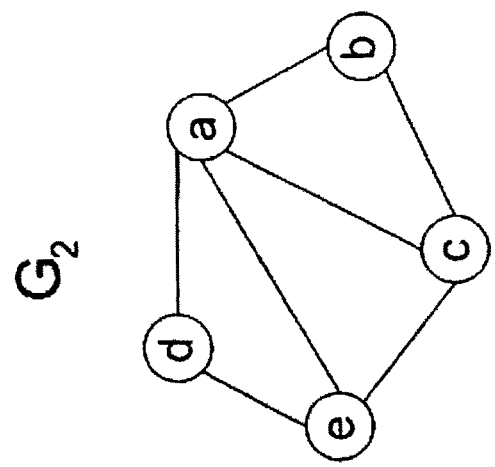
FIG. 3 illustrates a graph isomorphism.
Figure 3:
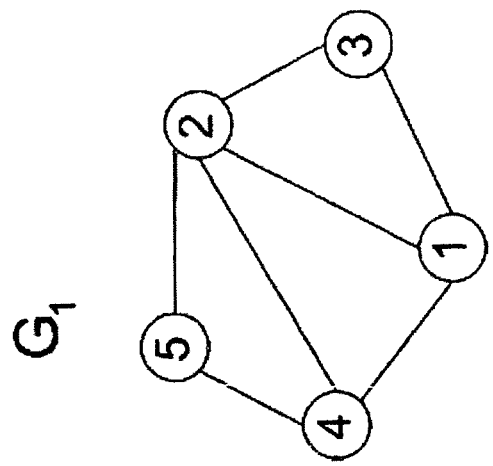

Referring now to FIG. 3, another NP problem is graph isomorphism. Here, two graphs $G_1=(V_1E_1)$ and $G_2=(V_2E_2)$ that have the same sets of vertexes $V_1=V_2=\{1, 2, \ldots, n\}$ are isomorphic, if there exists a permutation $\pi$ on vertexes $\{1, 2, \ldots, n\}$ so that $(u, v) \epsilon E_1 \longleftrightarrow (\pi(u), \pi(v)) \epsilon E_2$.

With a protocol based on the graph isomorphism, a public key is composed of two isomorphic graphs $G_1$ and $G_2$, and a private key comprises a permutation $\pi_p$, such that $G_2=\pi_p(G_1)$. While the problem is not likely to be NP-complete, it is NP, as there is no known polynomial-time algorithm that solves the problem.

Figure 1:
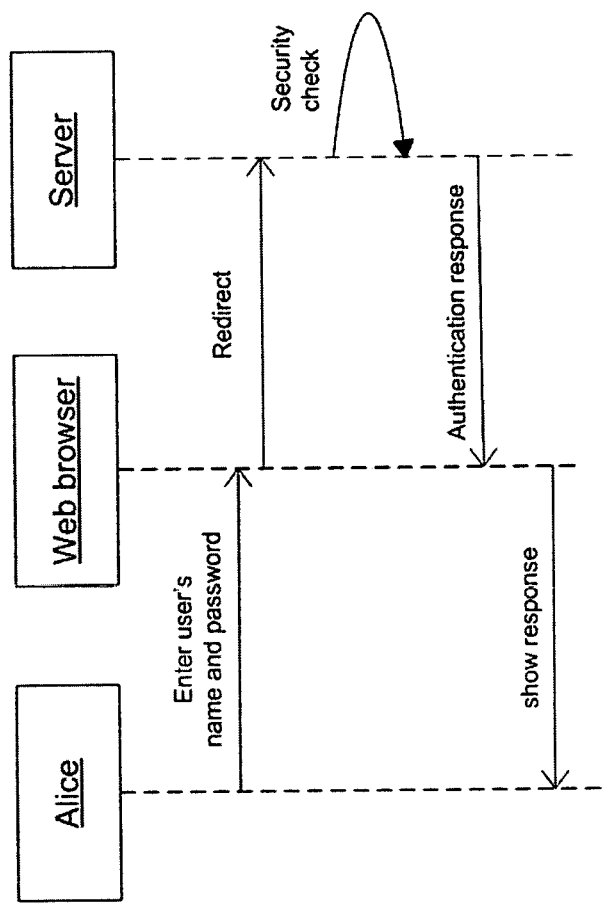
FIG. 1 illustrates a typical web authentication scheme.
Figure 2:
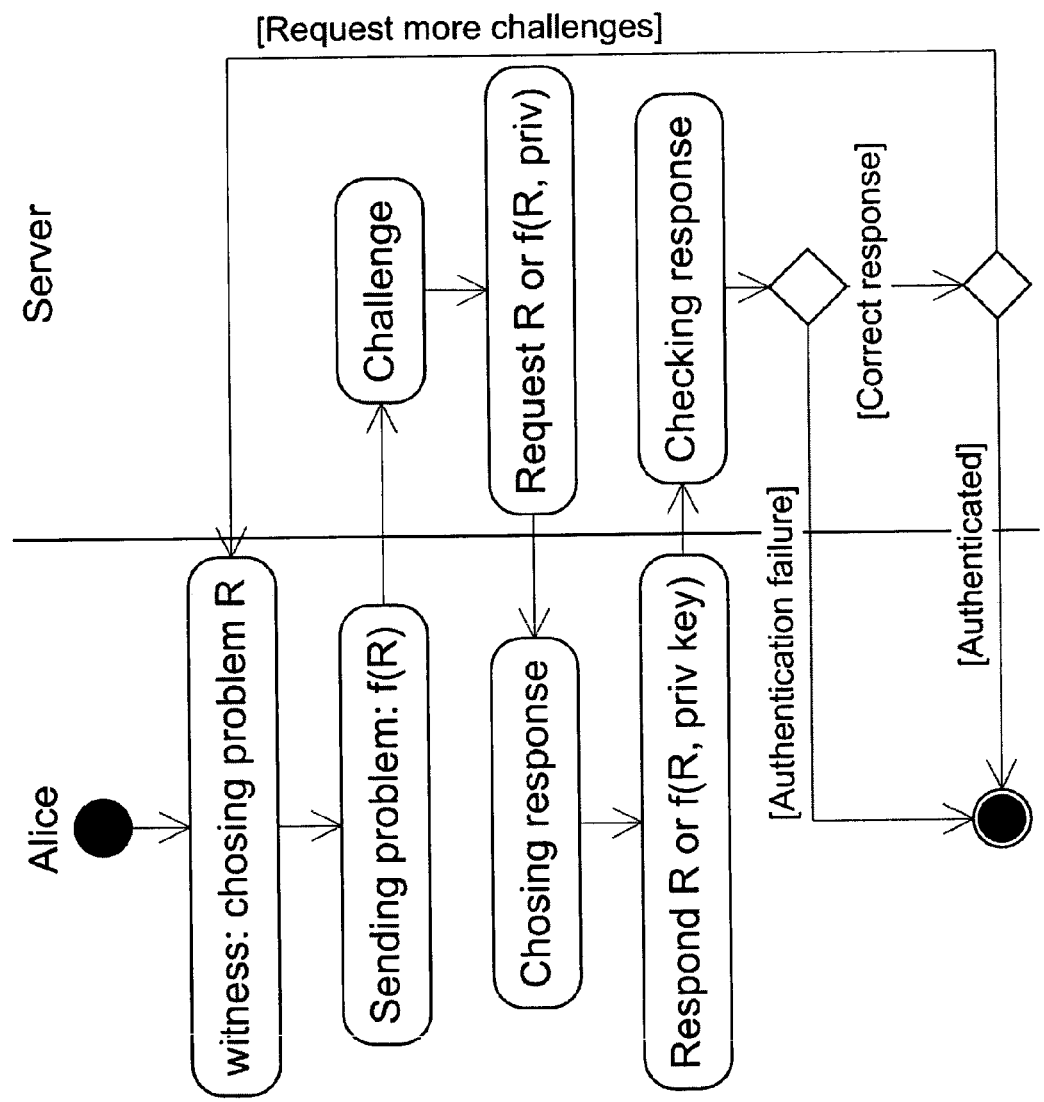
FIG. 2 is a schematic diagram of a typical zero-knowledge proof challenge-response protocol.

In a challenge-response protocol based on this public-private key pair, such as outlined in relation to FIG. 2, a prover generates a random permutation $\pi_R$, and sends a graph $G_R=\pi_R(G_1)$ to the verifier. Then, depending on the verifier's challenge, the prover sends back $\pi_R$ or $\pi_{R2}$ such that $\pi_{R2}=\pi_R \circ \pi_p^{-1}$, where $G_1=\pi_p^{-1}(G_2)$ and $\circ$ is a composition operator on the two permutations.

Thus, the verifier is able to check one of the conditions:

$$G_R=\pi_R(G_1) \text{ or } G_R=\pi_{R2}(G_2)$$

Knowledge about only one-parameter $\pi_R$ or $\pi_{R2}$ does not let the verifier compute the prover's private key.

Nonetheless, when attempting to implement a ZKP protocol based on the graph isomorphism, there is still the problem of how to maintain, generate or provide access to the user's private key without transmitting their credentials across the network or requiring that they be stored locally on a user's machine.

In the preferred embodiment of the present invention, the browser calculates the private key required to implement the ZKP protocol from a user's password. The browser can then generate challenge graphs and challenge responses as described above or indeed for use in any private-public key authentication protocol.

Figure 4:
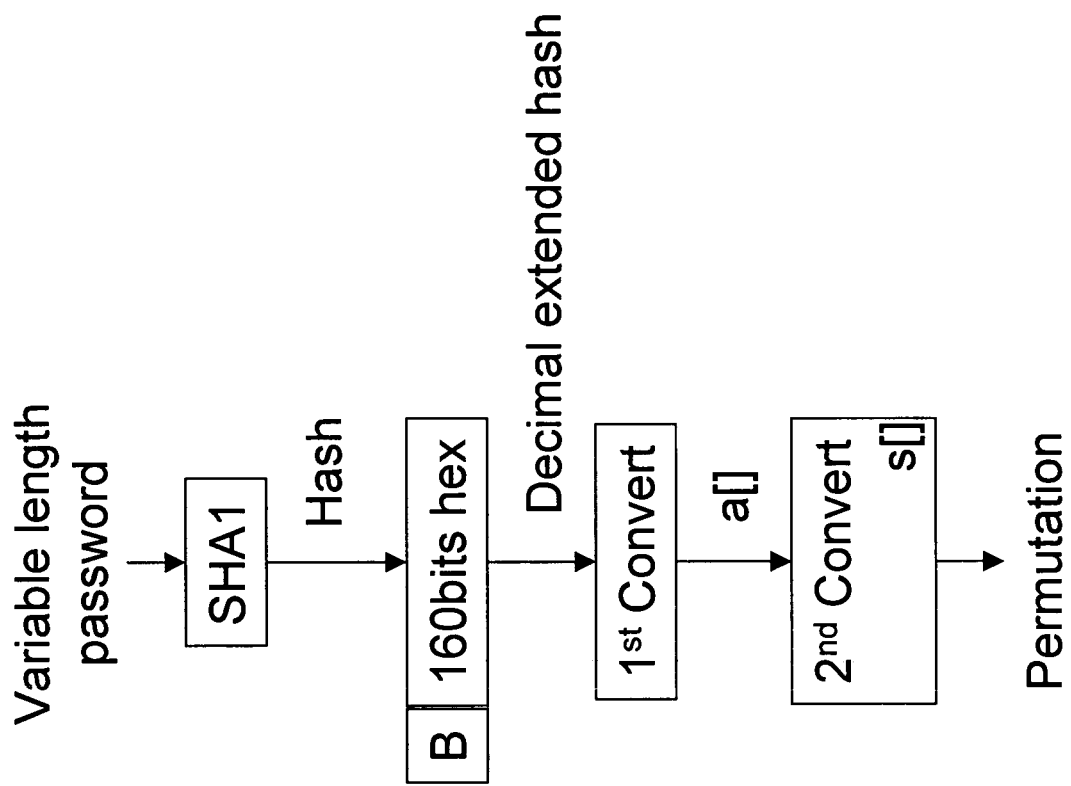
FIG. 4 illustrates the calculation of a permutation according to a preferred embodiment of the present invention.

Referring now to FIG. 4, a user's private key $\pi$ is a permutation. In the preferred embodiment, a user's password is transformed to a corresponding permutation using a one-way function as well as taking other steps required to ensure the required size of permutation for use with graphs of a given size.

In the embodiment, Secure Hash Algorithm—Version 1.0 (SHA1) is used as this computes a 160-bits-long hash for any string that is no longer than 2^64-bits. Such a hash is composed of numbers 0-9, a-f; and as such, the hash can be used at least as part of a hexadecimal index to a table of permutations.

All the generated hashes have the same size, i.e. 160 bits and so their corresponding index numbers when sorted in lexicographical order in a table are from 38!+1 to 40!. If the hash alone were used as an index into a table of permutations stored in lexicographical order, different hashes would be mapped to permutations of varying lengths. Thus, in the embodiment, all hashes are extended with a hexadecimal character "b" at the beginning of each obtained hash. This extension means that the extended hashes point to index positions 41!+1 to 42!; therefore, all the generated permutations have the same length.

The key size, of course, can be changed, if another hash generation algorithm is used.

In the preferred embodiment, the web-application calculates the permutation indicated by the extended hash in two steps, the first being based on the observation that all the natural numbers can be represented as:

$$a_{k-1}0!+a_{k-2}1!+a_{k-3}2!+ \ldots +a_0k! \text{ for any natural number } k$$

As such, we find the $a_{k-1}0!+a_{k-2}1!+a_{k-3}2!+ \ldots +a_0k!$ representation of the extended hash.

This can be done using a function of the following form for converting "number", the extended hash in decimal format, to the vector a[ ]:

```
Convert(number)
{
        var int i:= 0;
        var int factor;
        var int a[ ]
        while(number > 0)
            {
                    factor:= GreatestFactorial(number)
                            // returns the smallest factorial
                            that is greater than the given number
                        a[i]:= number/factor
                        number:= number − a[i]*factor
                i=i+1
            }
        return a
}
```

In the preferred embodiment GreatestFactorial( ) is implemented with a predefined table of factorials and a binary search algorithm.

A simple example of this first convert function follows:

$$562=4*5!+3*4!+1*3!+2*2!+0*1!+0*0!$$

We can easily calculate it dividing this number by highest possible factorials (0!=1, 1!=1, 2!=2, 3!=6, 4!=24, 5!=120, 6!=720):

562/120=4 remainder 82

82/24=3 r 10

10/6=1 r 4

4/2=2 r 0

0/1=0 r 0

0/1=0 r 0

So, we create a table a[ ] and we fill the table with the calculated coefficients:
a[0]=4; a[1]=3; a[2]=1; a[3]=2; a[4]=0; a[5]=0

The second step of the conversion takes as input the table a[ ], and returns as output, a table permutation[ ] that contains the created permutation.

The convert function requires a temporary structure s, on which the following functions can be performed:

insert (x)−>adds number x to the structure
remove (x)−>removes number x from structure
element At (j)−>returns a number i that satisfies the condition: there are exactly j−1 smaller numbers than i in the structure
full(n)−>return a structure with integers 0, 1, . . . (n−1)

For example, with s=0, 1, 2, 3 by removing an element at second position we get s=0, 1, 3, and if we repeat the operation we have s=0, 1.

The structure s could comprise a simple table, however, the complexity of operating the table would be O(n).

In the preferred embodiment, a B-Tree; and in particular, an AVL tree which is a special case of a B-Tree is used for the structure s. In such structures, the computational complexity of removing elements is O(log n).

```
Convert (a)
{
    var int n:= length a
    s:= full (n)
    for i=0 to (n−1)
    {
        s.insert (i)    //Initializing our temporary structure
    }
    for i=0 to (k−1)
    {
        permutation[i]:=s.elementAt(a[i])    //getting an element at a
                                               certain position
        s.remove(a[i])  //removing the taken element
    }
    return permutation
}
```

Taking the previous example of an extended hash with a decimal value of 562, a temporary structure s[ ] of n=6 elements is first created, so:
s[0]=0; s[1]=1; s[2]=2; s[3]=3; s[4]=4; s[5]=5

Then, in the next loop we analyze the table a[ ] delivered by the first conversion:
a[0]=4;a[1 ]=3; a[2]=1 a[3]=2; a[4]=0; a[5]=0

Because a[0]=4, so we take element s[4]=4 and add this to the permutation (p in the example below).

Therefore, p[0]=4, we remove this element from the structure s, so s has now 5 elements:
s[0]=0; s[1]=1; s[2]=2; s[3]=3; s[4]=5

Then, a[1]=3, so:
p[1]=3 and we remove this element from s:
s[0]=0; s[1]=1; s[2]=2; s[3]=5

Then, a[2]=1, so
p[2]=1 and s after removing this element:
s[0]=0; s[1]=2; s[2]=5

Then, a[3]=2, so:
p[3]=5
s[0]=0; s[1]=2

Then, a[4]=0, so:
p[4]=0
s[0]=2

Then, a[5]=0, so:
p[5]=2
s=empty

Therefore, we have generated the permutation:
p[0]=4; p[1]=3; p[2]=1; p[3]=5; p[4]=0; p[5]=2

It will therefore be seen from the examples above that from a variable length password, it is possible with code having a relatively small footprint capable of being downloaded and readily executed in a browser, to generate a permutation $\pi_{priv}$, which can in turn be used in a ZKP protocol to authenticate a user across a network without transmitting any private information across the network or requiring secure storage to be available locally.

For an example of such a protocol, let's assume that Alice is the prover, whereas Bob is the verifier. She knows the permutation $\pi_{priv}$ between two graphs $G_1$ and $G_2$. Bob also knows the graphs. She wants to convince him that she knows the permutation, but she is going to keep it secret.

Registration:
1. Alice's browser transforms her password to a permutation $\pi_{priv}$, that is her private key.
2. Alice's browser generates a random graph $G_1$
3. Alice's browser computes graph $G_2=\pi_{priv}(G_1)$
4. Alice's browser publishes graphs $G_1$, $G_2$ and her username. She keeps $\pi_{priv}$ secret.

Alice is able to convince anybody that she is the publisher of such credentials, while she keeps the password secret.

Figure 5:
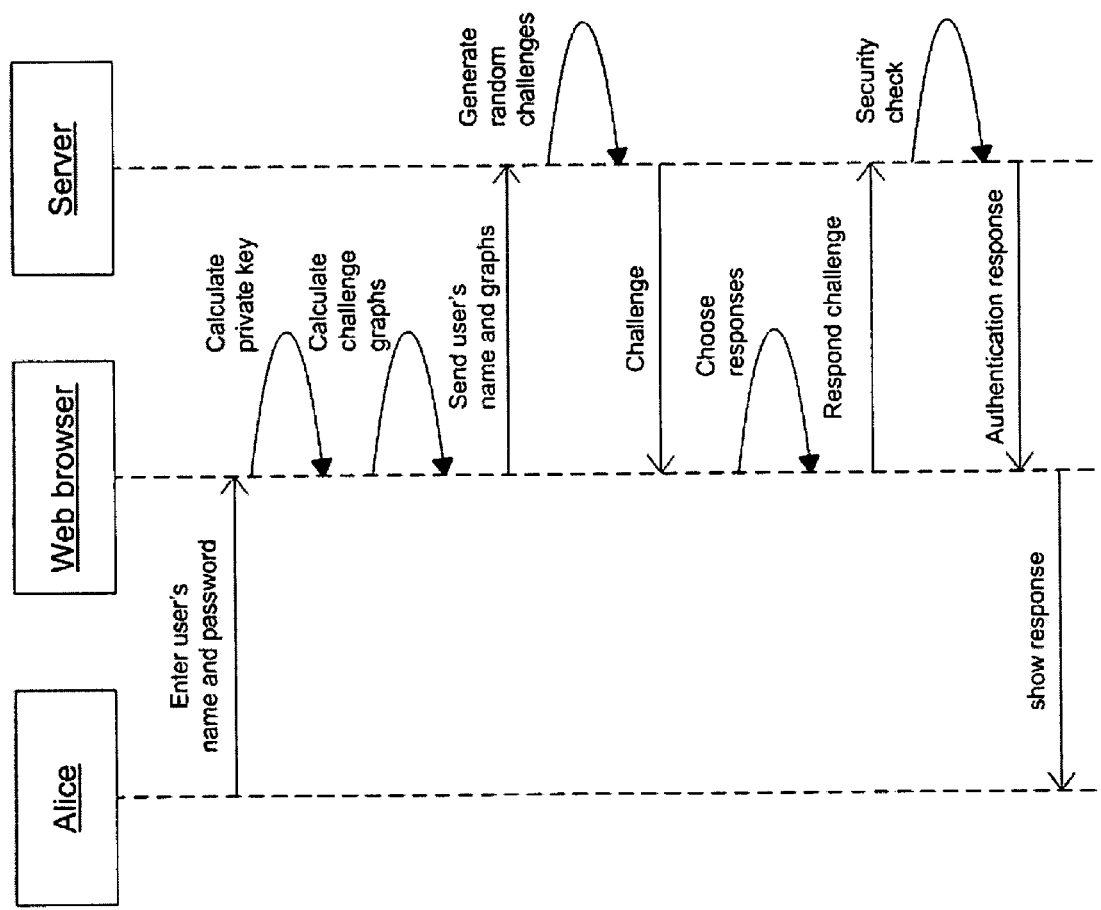
FIG. 5 illustrates a ZKP protocol based on graph isomorphism according to a preferred embodiment of the present invention.

Authentication, FIG. 5:
1. Alice's browser is acquiring the number of challenges t from Bob
2. Alice's browser generates t random permutations: $\pi_{R1}$, $\pi_{R2}$, ... $\pi_{Rt}$.
3. Alice's browser calculates t graphs $G_{R1}$, $G_{R22}$, ... $G_{Rt}$ such that $G_{Rn}=\pi_{Rn}(G_1)$ where n∈{1, 2, . . . , t}
4. Alice's browser sends the generated graphs to the Bob
5. Bob stores the graphs and generates t random challenges $v_1, v_2, \ldots, v_t$ such that for all i∈{1, 2, . . . , t}, $v_i$∈{0, 1} (The number of challenges t is determined by the acceptable response time and is typically of the order of 30).
6. Bob sends the generated challenges to Alice
7. Alice's browser constructs a response vector $R_1, R_2, \ldots, R_t$ such that
for i=1, 2, . . . , t do
if $v_i$=0 then
$R_i=\pi_{Ri}$
else
$R_i=\pi_{Ri} \circ \pi_{priv}^{-1}$
end if
end for
8. Alice's browser sends the response vector to Bob
9. Bob checks her response
var $G_{temp}$
for i=1, 2, . . . , t do
if $v_i$=0 then
$G_{temp}=R_i(G_1)$
else
$G_{temp}=R_i(G_2)$
end if
if $G_{temp} \neq G_{Ri}$ then
return false
end if
end for
return true
10. Bob sends her a response. She is authenticated, only if all the challenges are answered correctly It will be seen from the outline of the protocol above that in order to authenticate a user, the protocol requires more than two steps: a user's request, a server's challenge, a user's response, and a server's response. Therefore, the protocol requires flexible communication. Thus, to make the zero-knowledge authentication feasible for a web application, preferred implementations of the invention are based on asynchronous technologies such as Ajax.

The term Ajax (Asynchronous JavaScript and XML) was introduced in 2005 and it enables communication between a user's browser and a server from which the user downloads a page. The communication is done by means of JavaScript and XML messages. Since the technology uses a scripting language, it is relatively slow. However, it is supported by most browsers, including Internet Explorer 5.0+, Firefox 1.0+, Safari 1.2, Opera 7.6+, Gecko browsers (Netscape, Camino, K-Meleon, Galeon), Konqueror 3.3 with a patch, and several others. There is no need for an additional plug-in, hence a code is always executed right after a page is loaded.

In the above described embodiments, the hash is created from a user's password. However, the invention can equally be implemented with alternative user specific identifiers.

Some such identifiers can be generated from a user's biometric characteristics, as long as the client device has access to this information. For example, the client device might include a fingerprint reader, a retinal reader, a smart card reader for reading user specific information from a user's smart card, or a wireless adapter capable or pairing the client device with another device which stores the user specific identifier, for example, a user's mobile phone.

For biometric information, it is important that the user is scanned such that the same identifier is produced each time, so that a consistent hash can be generated from this identifier.

The present invention can also be applied to Other ZKP techniques that involve deriving a permutation from a password. For example, the subgraph isomorphism, is a very similar problem to the graph isomorphism and is also known to be NP-hard. Hence, it is potentially more difficult to solve. This problem is a common generalization of many important graph problems (Clique. Independent Set, Hamiltonian Cycle, Matching, Girth, Shortest Path). With a protocol based on the sub-graph isomorphism, a public key is composed of two graphs $G_2$ and $A_1$, and a private key comprises a graph $G_1$ that is a sub-graph of $A_1$ and a permutation $\pi_{priv}$ such that $G_2 = \pi_{priv}(G_1)$.

In one particular challenge-response protocol based on this public-private key pair, a prover generates a random permutation $\pi_R$ such that $G_R = \pi_R(A_1)$, then the prover embeds graph $G_R$ into a bigger graph $A_2$, and sends a graph $A_2$ to the verifier. Then, depending on the verifier's challenge, the prover sends back $\pi_R$ and $G_R$; or a composition $\pi_R \circ \pi_{priv}^{-1}$ and the graph $G_R$.

Thus, the verifier is able to check one of the conditions:

$$\pi_R(A_1) = G_R \text{ or } \pi_R \circ \pi_{priv}^{-1}(G_2) = G_R;$$

Using this protocol changes some of the properties that are achieved using graph isomorphism: the public keys are bigger; more memory and bandwidth are required to perform communication and computation; and the problem is known to be more difficult to break.

By comparison with the first embodiment, the second embodiment is implemented generally as follows:

Since the private key comprises of two elements: a permutation $\pi_{priv}$ and the sub-graph $G_1$, there is a need to calculate two elements from the given user's password.

$A_1$ is first chosen as a random graph of size 41.

As before, the user's password is transformed with SHA1 to provide an extended hash comprising 20 hexadecimal characters, each character being represented by 4 bits. Hence there are 80 significant bits and these 80 bits are used to select a sub-graph $G_1$ of $A_1$. For example:

If the hash bits are 00 or 01, we skip the vertex of $A_j$.
If the hash bits are 10 or 11, we take the vertex of $A_1$ to the sub-graph $G_1$ Vertex number 41 of $A_j$ is taken to the sub-graph $G_1$, if the amount of bits in the extended hash was even.

This method generates a sub-graph $G_1$ that can be of a size up to 41. It implies that the size of the permutation $\pi_{priv}$ also has to vary in the given range (0-41). Therefore, there is also a need to normalize the extended hash to generate correct permutation size.

Thus, the normalized value x is calculated from the extended hash (in decimal format) as:

$$x := (\text{number of vertices of } G_1)!/41!*(\text{extended hash})$$

The normalized hash value x is then passed to the Convert (number) function described above to return the permutation $\pi_{priv}$.

Other means can be employed to store the user's identifier including portable storage devices, connecting to the client device through a USB port; or RFID devices carried by a user.

The invention is not limited to the embodiment(s) described herein but can be amended or modified without departing from the scope of the present invention.

The invention claimed is:

1. A method of generating a private key for use in an, authentication protocol comprising, at a client: receiving a user specific identifier provided by the user; converting the identifier through a one-way function to a string of a pre-determined length; and mapping said string to a permutation .pi..sub.priv, of a pre-determined order, said permutation being operable with a first graph G.sub.1 to generate a second public graph G.sub.2=.pi..sub.priv (G.sub.1).

2. A method of registering a user of a client computer to a server computer across a network, comprising: receiving a username for said user; generating a private key according to the method of claim 1; generating said first graph G.sub.1 of an order corresponding with said permutation; generating said second public graph G.sub.2 .pi..sub.priv (G.sub.1); and providing said username for said user and said first and second graphs to said server.

3. A method of authenticating a user of a client computer to a server across a network comprising: generating a private key according to the method of claim 1; at said client: a) transmitting a username for said user to said server; b) receiving one or more challenges from said server; c) for each challenge n, generating an associated random permutation . pi..sub.Rn; d) responsive to the value of the associated challenge, combining the random permutation with a version of said permutation .pi..sub.priv to provide a response R.sub.n comprising one of said combination or said random permutation; e) for each challenge generating a graph G.sub.Rn=R.sub.n(G.sub.1); and f) for each challenge, transmitting said response R.sub.n and said graph G.sub.Rn to said server.

4. A method according to claim 3 further comprising: at said server: g) for each challenge, receiving said associated response R.sub.n and said graph G.sub.Rn:h) responsive to the value of the associated challenge, generating a graph G.sub.temp=.pi..sub.Rn(G.sub.1) or G.sub.temp=.pi..sub.Rn (G.sub.1); and i) comparing G.sub.temp with G.sub.Rn, to authenticate said user.

5. A method according to claim 3 wherein said version of said permutation .pi..sub.priv comprises .pi..sub.priv.sup.-1 where G.sub.1 =.pi..sub.priv.sup.-1(G.sub.2).

6. A method according to claim 3 wherein the value of each challenge comprises one of 0 or 1.

7. A method according to claim 1 wherein said one-way function comprises a secure hash function and said string comprises a hash provided by said hash function.

8. A method according to claim 7 wherein, said mapping comprises: converting a number num corresponding to said hash to a vector a[ ] of length k wherein: $num = a_{k-1}0! + a_{k-2}1! + a_{k-3}2! + \ldots + a_0 k!$; and converting said vector [ ] an to said permutation $\pi_{priv}$.

9. A method according to claim 8 wherein said converting said vector a[ ] comprises: creating a structure s[ ] of length k, each element of said structure comprising an element of said permutation $\pi_{priv}$; and iteratively choosing a value for each position of the permutation as a function of the value of the corresponding element of the vector a[ ].

10. A method according to claim 9 wherein said function of the element of the vector a[ ] returns a number i that satisfies the condition: there are exactly j−1 smaller numbers than i in the structure, j being the value of the element of the vector a[ ]; and wherein said method further comprises:
removing said element i from the structure.

11. A method according to claim 9 wherein said structure s[ ] is a binary tree.

12. A method according to claim 8 wherein said number num is a decimal number.

13. A method according to claim 7 wherein said hash consists of characters 0-9 and a-f.

14. A method according to claim 13 comprising pre-fixing said hash with the character B.

15. A method as claimed in claim 1 comprising: randomly generating a public graph $A_1$; and generating the first graph $G_1$ as a sub-graph of the graph $A_1$ as a function of said user specific identifier.

16. A method as claimed in claim 15 wherein the step of generating the sub-graph $G_1$ comprises: sequentially selecting vertices for the sub-graph $G_1$ from the graph $A_1$ in accordance with the value of successive bits of said string.

17. A method as claimed in claim 16 further comprising: prior to mapping said string to said permutation, normalizing said string in accordance with the size of said sub-graph $G_1$, so that the size of said permutation corresponds with the size of said sub-graph $G_1$.

18. A computer program product comprising a computer readable medium including computer readable code which when executed on a computing device is arranged to perform the steps of claim 1.

19. A computer program product according to claim 18 implemented in Javascript and executable with a web browser running on said computing device.

20. A method according to claim 1 wherein the user specific identifier comprises one of: a password entered by the user; or biometric data read from the user at said client.

* * * * *